UNITED STATES PATENT OFFICE.

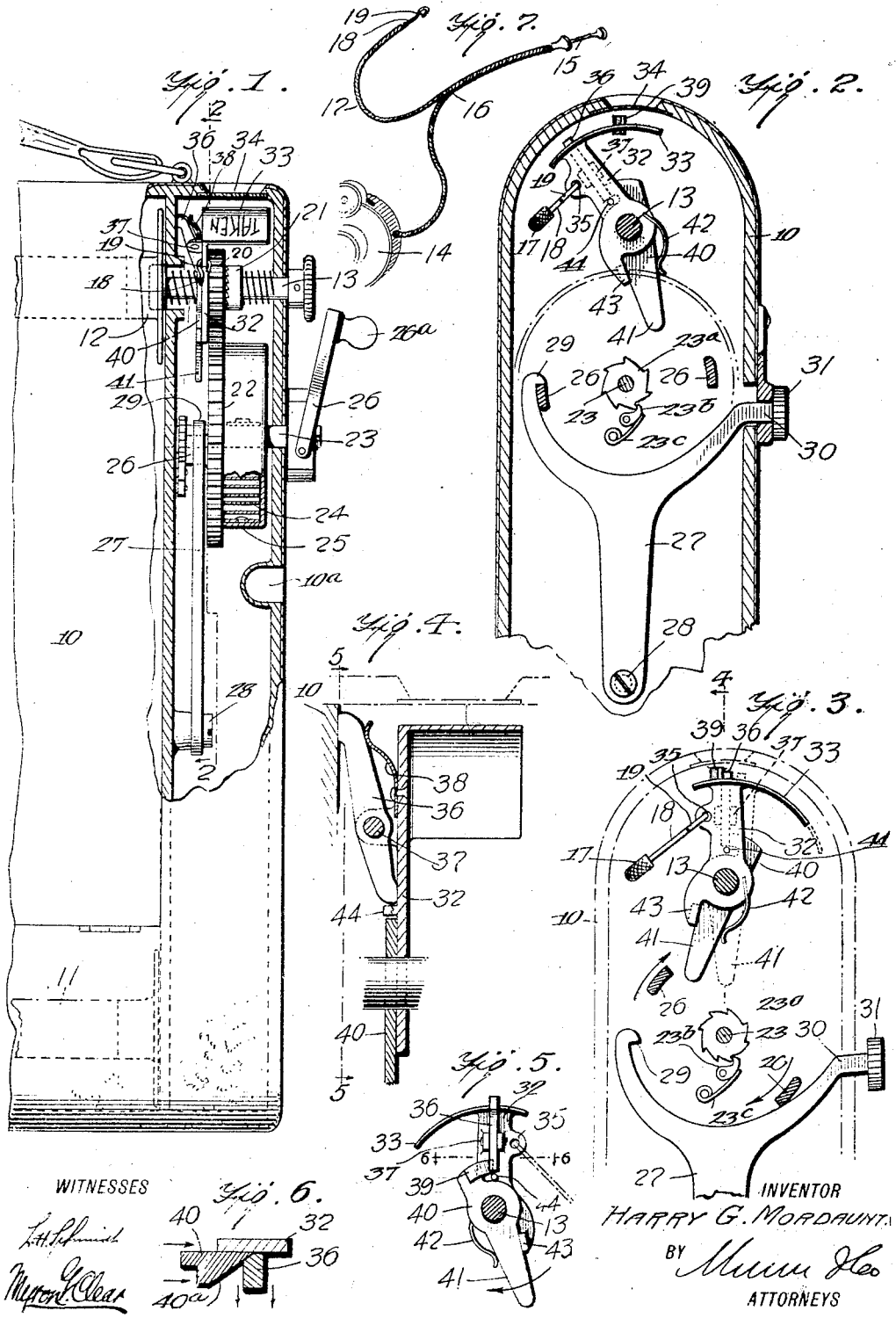

HARRY G. MORDAUNT, OF SALT LAKE CITY, UTAH.

CAMERA.

1,253,079.  Specification of Letters Patent.  Patented Jan. 8, 1918.

Application filed March 1, 1917. Serial No. 151,711.

*To all whom it may concern:*

Be it known that I, HARRY G. MORDAUNT, a citizen of the United States, and a resident of Salt Lake City, in the county of Salt Lake and State of Utah, have invented a certain new and useful Improvement in Cameras, of which the following is a specification.

My present invention relates generally to cameras, and more particularly to cameras including a signal device which is set at each picture taking operation, to notify the operator that that portion of the film then in proper position has been exposed, and one wherein the signal so set is released to move to inactive position by the shifting of the film to bring the succeeding portion thereof into proper position for exposure.

My present improvements further relate particularly to a camera involving the above means either in built-in form or as an attachment, as illustrated in my application, Serial Number 149,046, which was filed February 16, 1917.

An object of my present improvement is to provide means in connection with a camera having the above mechanism, whereby to prevent the superposing of pictures, that is, the taking of a second picture upon the same film before the latter has been shifted.

In carrying out these objects I preferably provide the signal member with means whereby it may be latched or held in its operative position with the shutter actuating means attached thereto, so as to thereafter prevent a full stroke of the shutter actuating means necessary to open the shutter, until the film is shifted. The means provided for this purpose, however, allow for sufficient movement of the shutter actuating means to permit of closing of the shutter when taking what are known as time exposures.

The objects, and the means for carrying out these objects, will be better understood from the following detailed description thereof, reference being made to the accompanying drawing forming a part of this specification and wherein—

Figure 1 is a partial front elevation, partly broken away and in section, illustrating my present improvements;

Fig. 2 is a vertical sectional view taken substantially on line 2—2 of Fig. 1, with the signal member in inoperative position;

Fig. 3 is a similar view of the signal member in operative position;

Fig. 4 is a vertical section taken substantially on line 4—4 of Fig. 3;

Fig. 5 is a sectional view taken substantially on line 5—5 of Fig. 4, and upon a reduced scale;

Fig. 6 is a detail horizontal section taken substantially on line 6—6 of Fig. 5, and Fig. 7 is a diagrammatic perspective showing a portion of the shutter and the shutter actuating means to which my improvements are connected.

Referring now to these figures, and particularly to Fig. 1, I have shown a camera casing at 10, the camera being of a conventional type, having film feed and take-up rolls 11 and 12 respectively, the shaft of the latter of which is indicated at 13, the camera including the usual film exposure means of which the shutter of conventional type within a shutter casing as indicated at 14, is a part.

The shutter in the present instance is preferably actuated by a wire release 15 extending through the usual protecting flexible casing or sheath 16, from an intermediate point of which I extend a second casing or sheath 17, through which the wire 18 projects, this wire being connected at one end to the wire release 15 and having a terminal exteriorly projecting hook 19 at its opposite end.

As in my application above referred to, the shaft 13 of the take-up roll has a gear wheel 20 loosely mounted thereon, and provided with a clutch face for engagement by a clutch member 21, the latter being connected to the take-up shaft. Engaging the gear 20 is an enlarged gear 22 mounted upon a shaft 23 parallel to the shaft 13, and to which is secured one end of an actuating spring 24 arranged within a housing 25, the gear 22 being loose upon the shaft 23 and placed under tension by the spring 24, the latter of which may be wound by a handle or lever 26 having a ratchet connection with the outer end of the shaft 23 projecting laterally through one side wall of the casing 10. This same side wall has a depression 10$^a$ which receives the knob 26$^a$ of the lever 26 when the latter is inactive.

The gear 22 has diametrically opposed inwardly projecting lugs 26, and is controlled in its rotation by means of a lever 27 pivoted at 28 at its lower end, as best seen in Fig.

2, and having its arcuately curved upper end provided at one side with the lug engaging hook 29, the lever 27 being releasable by virtue of the laterally and exteriorly projecting extension 30 at the opposite side of its said curved upper end, and having a finger piece or push button 31.

Shiftable upon the take up shaft 13, as clearly seen by a comparison of Figs. 2 and 3, is a signal lever 32, having at its upper end an arcuately curved plate 33, on which suitable indication, for instance, the word "Taken", may be printed, to show through the upper side opening 34 of the camera casing when the lever is moved to its vertical operative position, as shown in Fig. 3. The lever is moved to its vertical operative position, as seen in Fig. 3, by the supplemental wire 18 of the shutter releasing mechanism, and in my application filed February 16, 1917, Serial No. 149,046, above referred to, provision was made for the shifting of lever 32 from the operative position shown in Fig. 3, to the angular inoperative position shown in Fig. 2, by either of the lugs 26 of the film winding gear 22.

In the present instance, however, lever 32 has an opening 35 at one side, in which the hook 19 of wire 18 is engaged, and the lever is further provided with a supplemental lever 36 intermediately pivoted at its inner side at 37, as particularly seen in Fig. 4, the upper end of which is acted upon by a spring 38 to normally force the same away from the signal lever and into engagement with the stationary lug 39, the latter disposed below one side of the sight opening 34, so that when engaged by the supplemental lever 36 it will lock the signal lever 32 in the vertical operative position, and thus prevent return movement of the wire 18, in this way preventing a second stroke of the shutter actuating wire 15 to which the signal actuating wire 18 is connected. In releasing the signal lever 32 from the operative position, the lower end of the latch lever 36 is acted upon by the upper beveled surface 40ᵃ of a releasing lever 40 fulcrumed upon the take-up shaft 13, as clearly seen in Fig. 5, and having its lower end or tail 41 depending into the path of movement of the lug 26 of the winding gear 22 when the said gear is released, as seen in Fig. 3. This lever 40 is normally held in inactive position by a spring 42, against a stop 43 of the signal lever 32, and when its lower end or tail 41 is engaged and moved by one of the lugs 26 of the winding gear 22, lever 40 is rocked so as to force its outer beveled end 40ᵃ between the lower end of the latch lever 36 of the adjacent surface of the signal lever 32, thus rocking the latch lever 36 upon its fulcrum 37 so as to withdraw its upper end free of the stationary lug 39 and against the tension of the spring 38, the signal lever having a projecting lug 44 into engagement with which the upper end of the releasing lever 40 moves after the latch lever 36 has been released, so as to shift the signal lever 32 from the operative position shown in Fig. 3 to the inoperative position shown in Fig. 2.

It is obvious from Fig. 3 that the full stroke of the wire 18 carries the signal lever past the operative vertical position, as seen in dotted lines, so that provision is thus made with the signal lever in the vertical operative position, for a partial stroke of the wire 18, and consequently the shutter actuating wire 15, sufficient to close the shutter in taking time exposures, though insufficient to open the shutter. The shaft 23 before mentioned carries a ratchet wheel 23ᵃ at its inner end engaged by a pawl 23ᵇ carried by the casing 10 and controlled by a spring 23ᶜ, to prevent rotation of the shaft 23 in one direction.

It will thus be understood that my invention provides simple and comparatively inexpensive means, whereby, in addition to the signal, superposing of pictures upon the film is prevented, the means provided for this purpose acting to automatically engage and hold the signal lever with the shutter actuating means, together with other means as just described, whereby these parts are automatically released upon actuation of the film winding mechanism to bring a succeeding portion of the film into operative position.

I claim:

1. In a camera, the combination with the shutter actuating means, of a signal lever, connections leading from the shutter actuating means and connected to said lever, for moving the latter to operative position when the said means are actuated, a locking lever pivoted to the said signal lever, a stationary lug with which the said locking lever is engageable in the operative position of the signal lever, to lock the latter and the shutter actuating means, a film winding mechanism including a rotating member having projections, a releasing lever pivoted adjacent the signal lever and having a depending spring controlled portion extending into the path of movement of the said projections of the film winding mechanism, the upper end of said releasing lever having means to engage and shift the locking lever to released position, substantially as described.

2. In a camera, the combination with the shutter actuating means, of a signal lever, connections leading from the shutter actuating means and connected to said lever, for moving the latter to operative position when the said means are actuated, a locking lever pivoted to the said signal lever, a stationary lug with which the said locking lever is engageable in the operative position of the signal lever to lock the latter and the shutter actuating means, a film winding mechanism including a rotating member having projections, a releasing lever pivoted adjacent the signal lever and having a depending spring controlled portion extending into the path of movement of the said projections of the film winding mechanism, the upper end of said releasing lever having means to engage and shift the locking lever to released position, said signal lever having a projection extending into the path of movement of the said releasing lever for engagement by the latter subsequent to the release of the locking lever, whereby to shift the signal lever to inoperative position.

3. In a camera, the combination with the shutter actuating means, and the film take-up roll, of a film winding mechanism having connection with the take-up roll, a signal, connections extending from the said shutter actuating means, and secured to the signal whereby to move the latter to operative position upon operation of the former, a lever carried by the signal for locking the same in operative position with the shutter actuating means, and a second lever acted upon by the said film winding mechanism to automatically release the first named lever and said locking means.

HARRY G. MORDAUNT.